Figure 1:
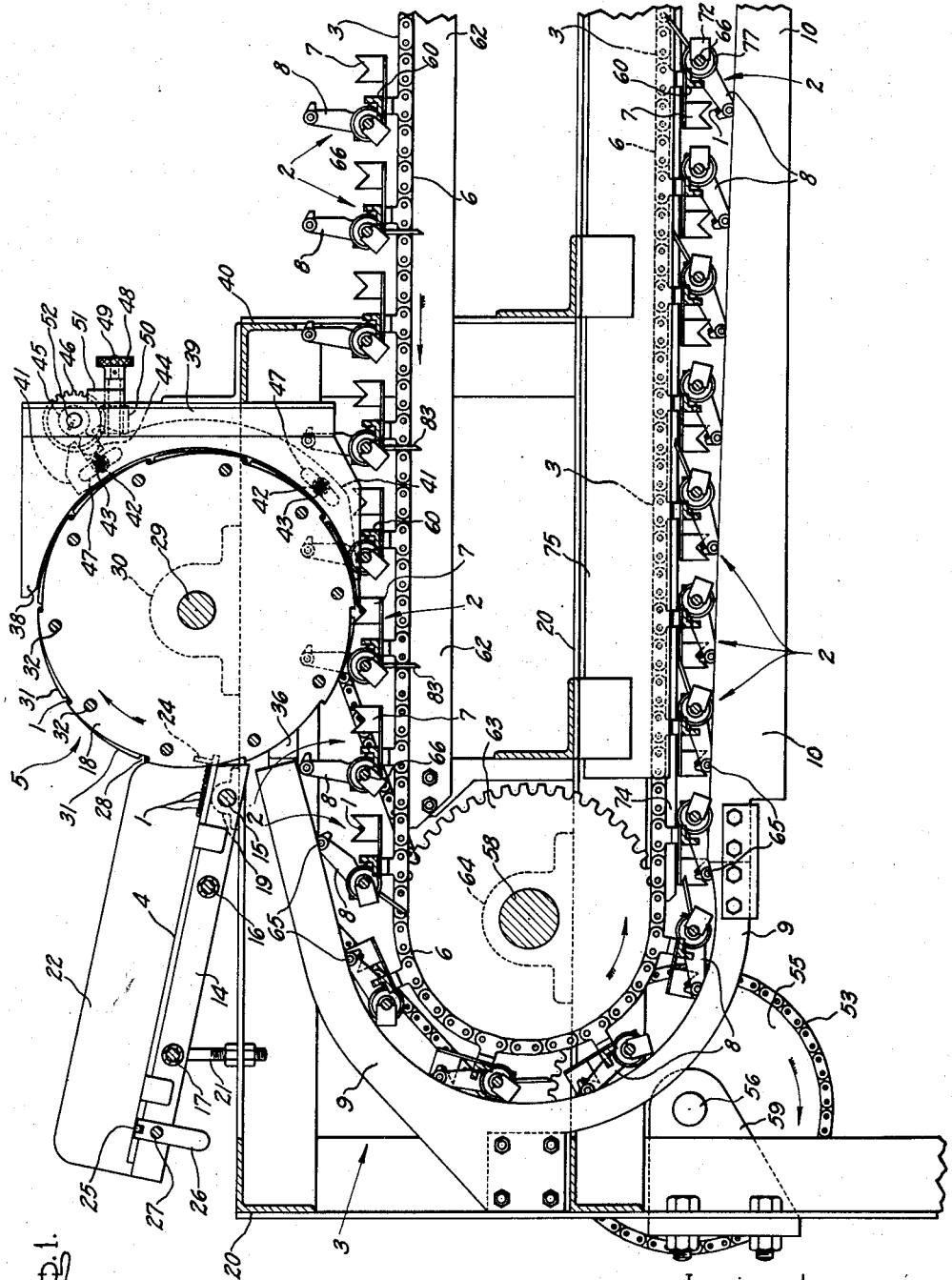

July 28, 1953 — O. A. BOYER — 2,646,881
WEIGHING AND SORTING APPARATUS
Filed March 31, 1949 — 4 Sheets-Sheet 1

Inventor:
Oscar A. Boyer,
by *Vernet C. Kauffman*
His Attorney.

July 28, 1953     O. A. BOYER     2,646,881
WEIGHING AND SORTING APPARATUS
Filed March 31, 1949     4 Sheets-Sheet 2
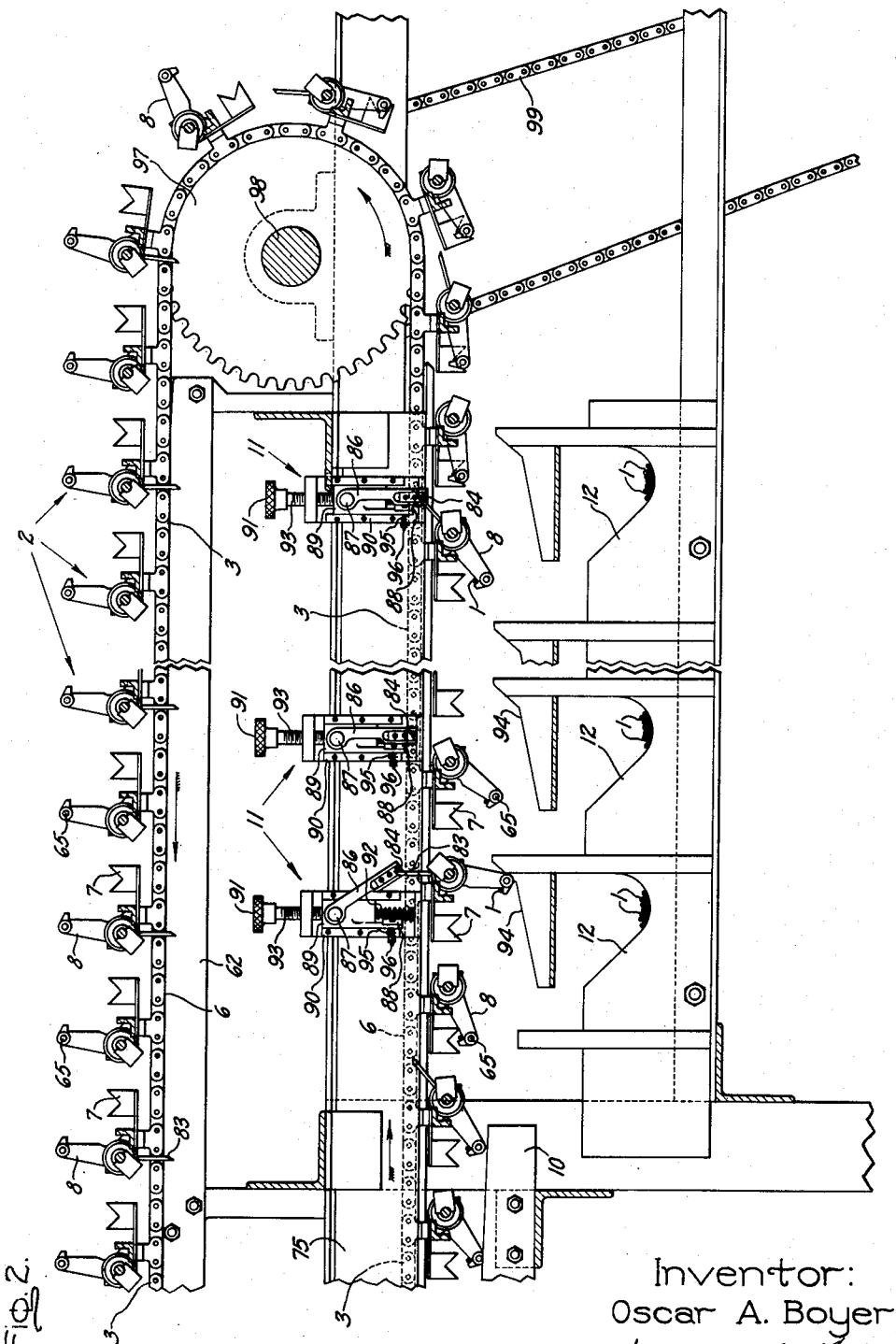
Inventor:
Oscar A. Boyer,
by *Vernet C. Kauffman*
His Attorney.

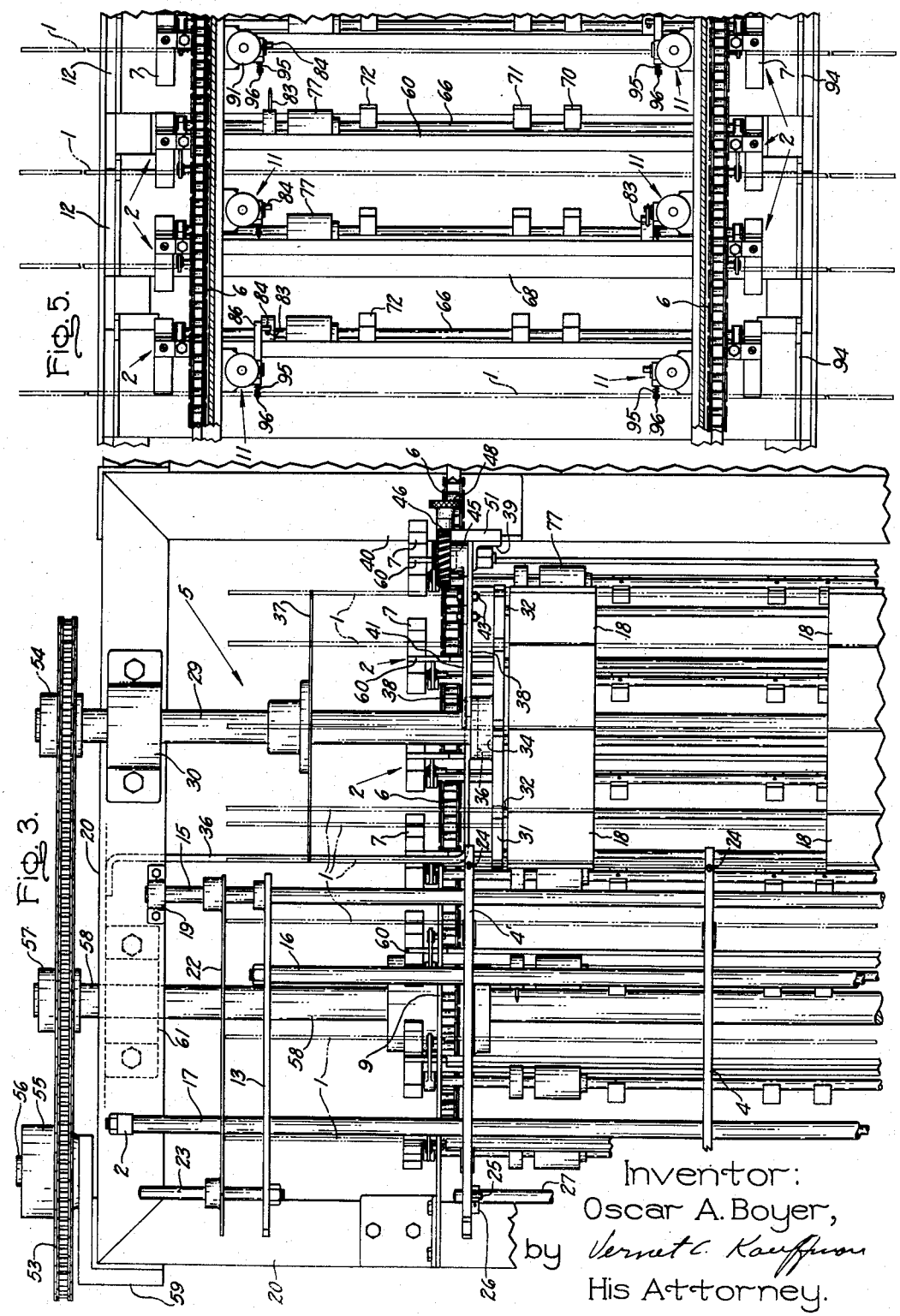

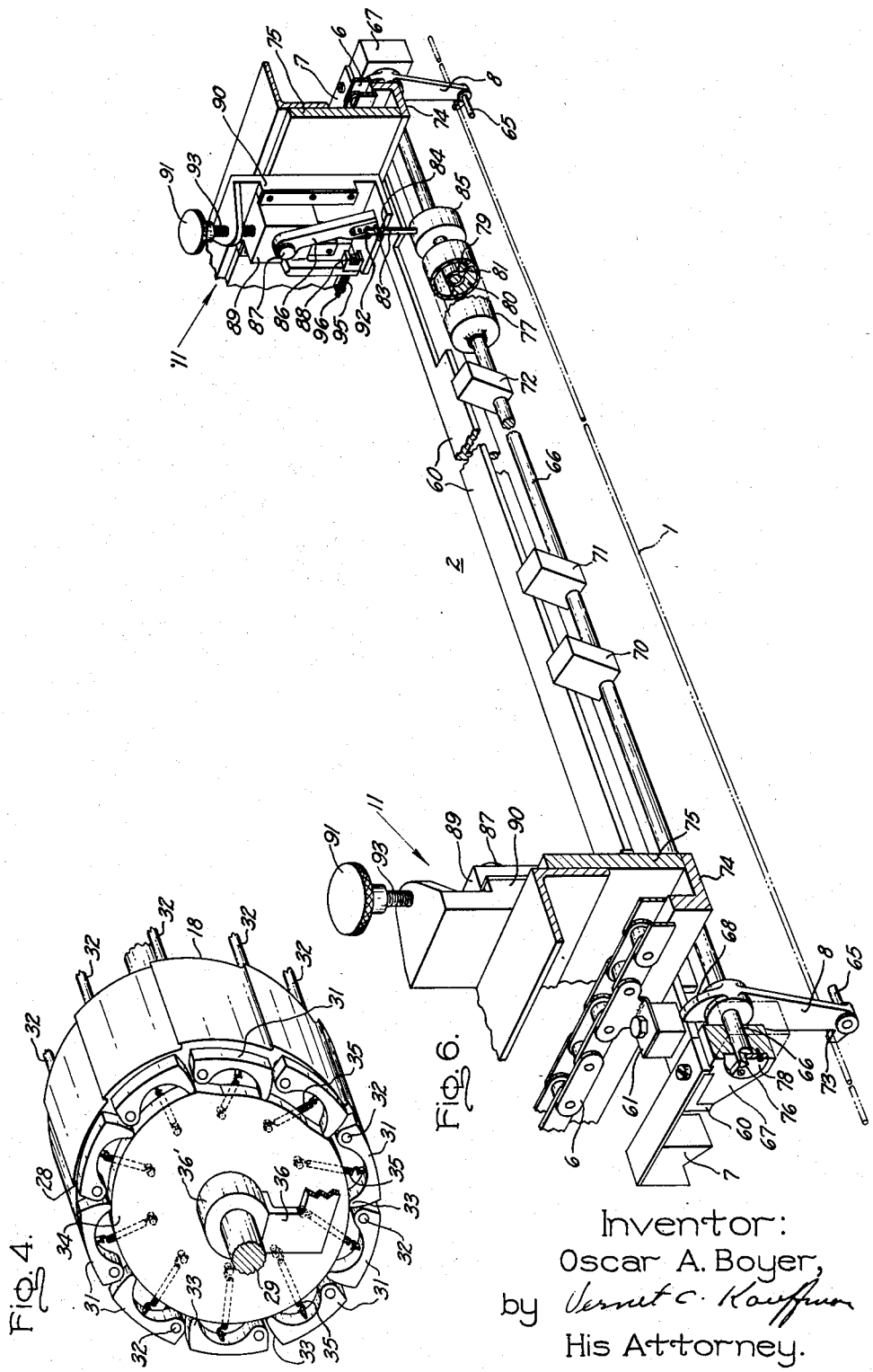

Patented July 28, 1953

2,646,881

UNITED STATES PATENT OFFICE 2,646,881

WEIGHING AND SORTING APPARATUS

Oscar A. Boyer, Cleveland, Ohio, assignor to General Electric Company, a corporation of New York Application March 31, 1949, Serial No. 84,646

14 Claims. (Cl. 209—121)

My invention relates to apparatus for sorting glass rod or tubing. More particularly my invention relates to automatically operated apparatus for sorting standard lengths of glass rod or tubing into groups or bundles of corresponding weight.

The manufacture of incandescent lamps, discharge tubes and similar devices involves the manufacture of many parts from sections of vitreous rod or tubing in automatic high-speed apparatus. To insure satisfactory operation of such atomatic apparatus it is material that the vitreous rods or tubing in a given batch be of substantially the same mass or, as determined by the sorting apparatus of my invention, of the same weight. In certain instances, as with vitreous tubing, the measurement of mass also involves the measurement of the size of said tubing, an operation which is performed separately from the weighing operation of the apparatus of the present invention.

According to one object of my invention, apparatus is provided which has a continuous, rather than an interrupted, course of operation and which is therefore better adapted to handle fragile articles made of glass. Apparatus of this type is also of advantage in that vibrations are to a very great extent eliminated and, therefore, do not influence the weighing operation, and also in that much higher speeds of operation are attainable without danger of breaking said articles or disturbing the weighing function thereof.

Another object of my invention is to provide accurately operating sorting apparatus for determining the weight of standardized lengths of vitreous rod or tubing in a single operation and on the basis of said single weighing operation separating said lengths into groups of corresponding weight classification. The accuracy of said apparatus is provided by the construction of the movable weighing means and the dampening means and other means, associated therewith only during a portion of the cycle of operation. Said means contribute to the satisfactory operation of the apparatus at much greater speeds than possible heretofore. The reduction of the weighing function of the apparatus to a single operation is also of particular advantage in that it eliminates the duplication of weighing apparatus, the multiplication of possible errors and permits the apparatus to be adapted to much higher speeds than possible in otherwise constructed apparatus.

Still other objects and advantages of my invention will appear from the following detailed description of a species thereof and from the drawing.

In the drawing, Fig. 1 is a side elevation developing from a vertical section through the length of the input end of the sorting apparatus; Fig. 2 is a corresponding section and elevation of the output end of the machine; Fig. 3 is a plan view corresponding generally to Fig. 1 of substantially one-half of the input end of the sorting apparatus; Fig. 4 is a perspective view of one of the feeding drums and associated means at the input end of the apparatus; Fig. 5 is a plan view of the full width of the apparatus taken from a section therethrough over a group of sorting means at the output end of the apparatus; and Fig. 6 is a perspective view of one of the weighing heads and a tripping means at the moment of association at one of the sorting positions of the apparatus.

Referring generally to the operation of the machine, the lengths of glass rod 1 which are weighed and sorted by the apparatus appearing in the drawing are automatically introduced into the weighing heads 2 which are carried at spaced intervals on an endless conveyor 3 moving continuously in horizontal paths between the input (Fig. 1) and the output (Fig. 2) ends of the apparatus. The glass rods 1 are supplied to the apparatus in relatively large groups which are placed upon the inclined rails 4 of the feeding means 5 associated with the upper span of the conveyor 3 at the input end thereof and are introduced singly into the weighing heads 2 by the feeding means 5 without interrupting the continuous motion of the conveyor 3. Each length of rod 1 is of a standard length, 48 inches for instance, and is received by spaced portions of a head 2 which extend between mount members on corresponding conveyor chains 6 (only one being shown in Figs. 1, 2 and 3) running along opposite sides of the apparatus.

In the directly following course of movement of the head 2, the glass rod 1 is carried (to the left in Fig. 1) the relatively short distance to the curved end of the conveyor 3 at the input end of the apparatus and then around and down into the lower span of said conveyor 3. The movement of the head 2 around the input end of the apparatus inverts said head 2 and thereby effects a transfer of the glass rod 1 from fixed support arms 7 to gravity operated tiltable weighing or scale arms 8 of said head 2. During the inverting movement and the subsequent motion of the head 2 advancing it to the right along the lower span of the conveyor 3, the weighing arms 8 are under the holding or restraining influence first of arcuate cams 9 and then cams 10, the latter of which are gradually inclined to permit the weighing arms 8 to gradually swing to positions determined by the weight of the respective glass rods 1. The still further travel of the weighing head 2, carrying it along the lower span of the conveyor 3 at the output end (Fig. 2) of the apparatus, causes it to pass through a succession of weight-grading stations having successive tripping means 11 (only a few of which appear in Fig. 2) one of which tips the weighing arms 8 in one of the heads 2 causing the glass rod 1 to be discharged into an associated hopper 12. The positions of the weighing arms 8 as determined by the weight of the glass rods 1, and the relative positions of the tripping means 11 are the controlling elements of the discharge function. Further movement of the weighing head 2 carries it from the lower to the upper span of the conveyor 3 and finally returns it to operative relation to the feeding means 5 thereby completing one cycle of operation.

Referring more particularly to the details of operation and construction of the apparatus, the initial step consists in placing a supply of glass rods 1 upon the inclined bed of the feeding means 5. The glass rods 1 are placed upon the bed which is formed by the rail 4 (Figs. 1 and 3) at the center of the apparatus, a corresponding rail 4' and the rail 13 (Fig. 3) at one side thereof, and other rails (not shown) duplicating rails 4' and 13 at the opposite side thereof. During all normal periods of operation, the bed retains a fixed position as the grouping of rails, represented by the rails 4 and 4' shown in the drawing and the rail corresponding to rail 4', straddle support bars (like that shown at 14) which bars, in combination with the rail 13 and its corresponding rail, are retained in position by the transversely extending rods 15, 16, 17. The glass rods 1 are, however, advanced by inclination of the bed of the feeding means 5 which causes the glass rods 1 to roll down against a feed drum 18 at each side of the apparatus. The inclination of the bed of the feeding means 5 is established by the elevation of the rod 17. The rod 15 which is pivoted in bearing blocks (like that shown at 19) on the opposite sides of the frame 20 is a fixed member, whereas, rod 17 is positioned by the upstanding support screws (like that shown at 21) engaging the ends of said rod 17. Lateral placement of the glass rods 1 is governed by corresponding vertical plates at opposite sides of the bed of the feeding means 5, the plate 22 shown, which is mounted on rods 15 and 17 and a pin 23 extending from rail 13, being representative of both plates. Although the cycle of operation of the feeding means 5 continues uninterruptedly during normal operation periods of the apparatus, it it often desirable during moments of adjustment, etc. to prevent said feeding means 5 from advancing the glass rods 1. At such times the supply of glass rods 1 upon the feeding means 5 is pulled back from engagement with the feed drums 18 by a longitudinal adjustment of the rails 4, 4' and the corresponding rail (not shown) which causes the posts 24 in the ends thereof to take positions outward of the periphery of said drums 18 and block movement of the glass rods 1. As shown in combination with rail 4, said rail 4 is positioned along its support bar 14 by engagement of a detent 25 extending into a notch in the hand lever 26 and is adjusted along said support bar 14 by manually turning said hand lever 26 about the axis of the rod 27. Although not shown, a corresponding hand lever 26 is located on the rod 27 adjacent each of the rails 4, 4' and the corresponding rail (not shown) and the manipulation of any one hand lever 26 turns said rod 27, which is pivoted in the support bars 14, and causes the desired adjustment of each rail 4 correspondingly.

The glass rods 1 in normal periods of operation of the apparatus roll down against the notched periphery of the feed drums 18, 18 which are located at the lower end of the bed of the feeding means 5 and are advanced by being caught in the notches 28 of said feed drums 18, 18 during the rotation thereof. Both feed drums 18, 18 are mounted on a transverse shaft 29 journalled in bearing blocks (like that shown at 30) on the side members of the frame 20 and are turned in a clockwise direction (Fig. 1) at a uniform rate to simultaneously advance corresponding notches 28 in each into position to receive glass rods 1. Passage of the glass rods 1 into the path of movement of the notches 28, which are in part defined by radially extending lips on the drums 18, 18, is readily effected inasmuch as the edges of said drums 18, 18 are gradually relieved between notches 28, and effects a separation of said glass rods 1 as said notches 28 are only sufficiently large to accommodate single glass rods 1. In the normal use of the apparatus, relatively large numbers of glass rods 1 pile up at the point of engagement with the periphery of the drums 18, 18 and often one or more excess glass rods 1 are sufficiently entangled with the single glass rod 1 within the notches 28 to be carried from the supply thereby. These excess glass rods 1 are, upon being carried above the usual extent of the piled glass rods 1, removed from the feed drums 18, 18 by outward movements of shoes 31 (Fig. 4) which are located upon the outer sides of the drums 18, 18 ahead of the respective notches 28 and which swing out over the glass rod 1 contained within the notch 28. The shoes 31 which turn about the axis of the shafts 32 are arranged so as to sweep away any glass rod 1 resting on the rods 1 within the notches 28 although they are spaced from the lips forming said notches 28 sufficiently so as not to trap the glass rods 1 therein. Each shoe 31 in cooperative relation to the corresponding notch 28 of the drums 18, 18 is mounted on a shaft 32 extending through both drums 18, 18 and at the moment of movement is swung outward correspondingly since the motion of said drums 18, 18 carries the heel portion 33 of the shoe 31 at the side of the apparatus appearing in Figs. 1 and 4 onto the higher portion of the edge of the stationary cam 34. Helical springs 35 extending between posts in the shoes 31 and adjacent portions of the drums 18, 18 keep said shoes 31 in engagement with the edge of the cam 34 and have heretofore kept the said shoes 31 drawn inward against a lower portion of said edge and inward of the relieved portion of the periphery of the drums 18, 18. The position of the cam 34, on the other hand, is established by the support shaft 29 for the drums 18, 18 and by the tortuous metal arm 36 extending between the frame 20 and a flat portion of a hub or boss 36' on said cam 34. When the rods 1 are located within the notches 28 in the drums 18, 18, they also receive the supporting influence of the disc 37 (Fig. 3) opposite one end of the shaft 29 and a corresponding disc (not shown) opposite the other end thereof.

The further movement of the glass rods 1 contained within the notches 28 of the feed drums 18, 18 carries said glass rods 1 over the top of said feed drums 18, 18 and, as the downward course of travel begins, behind fixed retaining plates (like plate 38 shown in Figs. 1 and 3) at both sides of the apparatus. The retaining plates are correspondingly positioned at each side of the apparatus and block radial movement of respective end portions of the glass rod 1 so that the glass rod 1 cannot move from the notches 28 in the feed drums 18, 18 and continues to be advanced thereby. Each retaining plate 38, as shown, is bolted to an angular upright member 39 attached to a cross member 40 of the frame 20 and has associated with its lower extremity an adjustable retaining plate 41 spaced correspondingly from the path of movement of the glass rod 1 and extending the retaining function of plate 38 beyond the end thereof. The adjustable feature of the retaining plate 41, which is supported by the rollers 42, 42 on the bolts 43, 43 extending from the side of the fixed retaining plate 38, permits said adjustable retaining plate 41 to be extended various amounts beyond the end of said fixed retaining plate 38 so that the position at which the glass rod 1 drops from the feed drum 18 can be changed. Different speeds of operation of the apparatus and different weights of glass rods necessitate different positions for the adjustable retaining plate 41 to cause the glass rods 1 to fall properly into the weighing heads 2 of said apparatus. As shown in Figs. 1 and 3, the adjustable retaining plate 41 at one side of the apparatus is held at a position determined by the engagement of the circular ear 44 on the boss or hub 45 of the gear 46 which ear 44 is located within a slot in the upper end portion of said adjustable retaining plate 41 and is adjusted in a path determined by the arcuate slots 47, 47 therein accomodating the rollers 42, 42 by rotation of the hub 45. The adjustment is made manually by rotation of the knob 48 on a shaft 49 holding a worm gear 50 in mesh with gear 46, which shaft 49 is journalled within a bracket 51 attached to the upright member 39 of the frame 20. The supporting shaft 52 for the gear 46 is journalled directly in the upright member 39 of the frame 20.

The feeding means 5 of the apparatus must advance a glass rod 1 to each of the weighing heads 2 thereof as said heads 2 pass into position below said means 5 and, accordingly, is synchronized with the operation of said weighing head 2 by being driven therefrom. The drive, which is located adjacent the side of the apapratus appearing in Figs. 1 and 3, rotates the supporting shaft 29 for the feed drums 18, 18 through motion of a chain 53 (Fig. 3) which is looped over a sprocket 54 on the end of said shaft 29. The chain 53 is also looped over an idler sprocket 55 on a shaft 56 and in the course of its movement between sprockets 54 and 55 passes over the driving sprocket 57 on the conveyor shaft 58. Support for the idler shaft 56 is provided by the bracket 59 which is attached to the corner post of the frame 20.

The glass rod 1 is released by the feeding means 5 at a moment when the V notched ends of support arms 7 of the weighing head 2 passes into position directly below the center of said feeding means 5 and opposite the tip ends of the retaining plates 41. The rod 1 is virtually trapped in the notch inasmuch as the pointed ends thereof have positions to either side of the glass rod 1. In every instance, the glass rod 1 drops to the bases of the notches in the support arms 7 of the head 2 and is carried along with said head 2 in its subsequent course of movement without interruption since the drums 18, 18 and the heads 2 have almost the same rate of movement and are located relatively near each other. As shown in Figs. 1, 3, 5 and 6, two widely spaced supporting arms 7 are provided by each weighing head 2 at positions on an angular bar 60, making up the main supporting element thereof, which cause them to engage the glass rod 1 at points about one-fourth the distance from each end thereof. The angular bar 60, in turn, is fastened at opposite ends to offset flanges 61 on spaced links of the chains 6, 6 at opposite sides of the apparatus, which chains 6, 6 make up the conveyor 3, of the apparatus. The weighing head 2 is following a course of movement at the input end (Figs. 1 and 3) of the upper span of the conveyor 3 at the time the glass rod 1 is received thereby and has a definite vertical elevation because of the additional support furnished the chains 6, 6 by guide rails (62 in the instance shown) at opposite sides of the frames 20. Further movement of the conveyor 3 advances the chains 6, 6, onto corresponding sprockets 63 (only one of which is shown) on the driven shaft 58, which is mounted in bearing blocks (like that shown at 64) on both side members of the frame 20, and carries the weighing arms 8 of the heads 2 to positions where the laterally extending pins 65 in the ends thereof engage the edges of fixed cams (as shown at 9). The weighing arms 8 of the heads 2 are located adjacent the support arms 7 thereof on a transversely extending shaft 66 pivoted in the bearing blocks 67 (Fig. 6) at opposite ends of the bar 60 and along the upper span of the conveyor 3 are biased to a vertical position where the heel portions 68 thereof bear against said bar 60 under the influence of the weights 70, 71 and 72 mounted along the length of the shaft 66. The engagement of the pins 65 on the ends of the weighing arms 8 with the cams 9, which are mounted on the frame 20 adjacent the entire path of travel of the head 2 about the input end of the apparatus, causes said weighing arms 8 to be pressed down to a position wherein their ends are directly over the glass rod 1 at which position they are arranged to receive said glass rod 1 as the head 2 is inverted in traveling about said input end. As shown by cam 9, the edges of both cams in the upper quadrant thereof draw progressively nearer the path of movement of the conveyor 3 and therefore gradually press the weighing arms 8 into position. The edge of the cam 9 in the lower quadrant thereof, on the other hand, is gradually spaced a small amount further from the path of movement of the conveyor 3 and allows the weighing arms 8 to drop down slightly so that the glass rod 1 separates completely from the support arms 7 and takes its natural position against the upstanding hooks or fingers 73 on the ends of said arms 8.

The subsequent movement of the glass rod 1 produced by the travel of the weighing head 2 through the lower span of the conveyor 3, first effects an upward movement of the weighing arms 8 which carries the glass rod 1 into engagement with one of the sloping surfaces of the notched end of each of the support arms 7 and then allows a gradual lowering movement thereof which permits them to take positions in accordance with the weight of the glass rod 1. The upward movement of the weighing arms 8 results when the pins 65 extending therefrom ride upon the upwardly curved edges of the ends of the cams (9 in the instance shown) opposite the initially engaged straight lower span of the conveyor 3 and, by causing the glass rod 1 to touch the support arms 7, dampens any vibration that may have developed therein. In the lower span of movement the chains 5, 6 of the conveyor 3 rests upon the upstanding edges of the guide tracks 74, 74 which are attached to the longitudinal members 75, 75 of the frame 20 and therefore establish a definite fixed path of movement of the weighing head 2. The lowering movement of the weighing arms 8 occurs as the pins 65 extending therefrom are carried onto the edges of cams (like that shown at 10) at opposite sides of the apparatus and results from the gradual downward slope of said edges with respect to the path of movement of the weighing head 2. The gradient of the slope of the edges of the cams (10 for instance) is such that the weighing arms 8 gradually swing down to positions where they balance the influence of the weights 70, 71 and 72 before passing beyond said cams and to the output end of the apparatus and take said positions without first passing through a period of oscillatory motion.

The accuracy of the position of the weighing arm 8 with reference to the weight of the glass rod 1 is directly responsible for the efficient sorting function of the apparatus and is assured in this present very high speed apparatus in part by the use of corresponding knife edges 76 at opposite ends of the shaft 66 to support said arms 8 and associated rotatable elements of the weighing head 2, and the use of an oscillation dampener 77 on said shaft 66. The knife edges 76 which have assumed the support of the weighing arms 8 and associated movable elements during the travel of the head 2 about the input end of the apparatus provide substantially frictionless support and thereby allow the shaft 66 to rotate freely until balance is established between the counterweighting effects of the weights 70, 71 and 72 and the glass rod 1. A working clearance between the end of the shaft 66 and the bearing blocks 67 permits said shaft 66 to separate sufficiently therefrom when the knife edges 76 seat in the notches in the bearing pads 78 attached to said bearing blocks 67 to eliminate the friction therebetween. The oscillation dampener 77 is only effective in restraining rapid rotation of the shaft 66 in that it is divided by a partition 79 immersed in a liquid 80, mercury in the present instance, and any rotation thereof must also cause the passage of said liquid 80 through openings 81 in the partition 79 from one side of said dampener 77 to the other.

The actual separation of the glass rods 1 into groups of corresponding weight takes place during movement of the weighing head 2 along the lower span (Figs. 2 and 5) of the conveyor 3 at the output end of the apparatus and is effected by variously adjusted tripping means 11 causing weighing heads 2 in particular degrees of balance to tip and discharge the glass rods 1 opposite said means 11. The several tripping means 11 are mounted on the longitudinal members 75 of the frame 20 of the apparatus at such positions above the hoppers 12 that the glass rods 1 caused to be discharged by each tripping means 11 are caught in a respective hopper 12 and thereby separated from the others. The apparatus contains in its entirety a considerable number of tripping means 11 spaced along the path of movement of the conveyor 3, all of which are of the same construction but are adjusted so as to be engaged by and tip weighing heads 2 holding glass rods 1 of successively lesser weight as the conveyor 3 advances along said path. The movement of the weighing heads 2 is the initiating force in that it advances an engagement means or finger 83 extending from the rotatable shaft 66 through a predetermined path and below or against a laterally projecting yieldably mounted stop 84 of the tripping means 11 depending upon the elevation of the stop 84. When the finger 83 engages the stop 84, it causes the shaft 66 and weighing arms 8, 8 to be tipped to a discharge position. Inasmuch as the elevational position of the end of the finger 83 is indicative of the balance of the head 2 and the weight of the glass rod 1 held thereby as said finger 83 extends from a fixed collar 85 on the shaft 66 thereof, the tripping means 11 causes all heads 2 carrying a glass rod 1 of a weight balancing said end of the finger 83 above the elevational position of the stop 84 thereof to be tipped. Accordingly, the first tripping means 11 along the course of movement of the weight head 2 causes all said heads 2 carrying a glass rod 1 of a weighing greater than an established maximum to be tipped and said rods 1 to collect in the first hopper 12 of the series held by the apparatus. Succeeding tripping means 11 along said course tip only those heads 2 carrying a glass rod 1 of a weight less than that tipped by the tripping means previously passed and therefore within specific weight limits.

As shown in detail in Figs. 2 and 6, the end of the finger 83 strikes the stop 84, which extends laterally from the arm 86 pivoted on the pin 87, in instances when said stop 84 is held at an elevation lower than the end of said finger 83. The engagement of the finger 83 with stop 84 causes the end of the finger 83 to be swung upward by the continuing movement of the weighing head 2 as said arm 86 has a fixed position at such times because of the attraction of the permanent magnet 88 therefore. Both the pivot pin 87 for the stop supporting arm 86 and the magnet 88 are attached to an adjustable slide 89 located within ways of a fixed bracket 90 on the frame member 75 and are capable of being adjusted vertically so as to reposition said tripping means 11 and change the effective position of the stop 84 by manual rotation of the knob 91. A helical spring 92 (Fig. 2) located between the slide 89 and a lower flange on the bracket 90 keeps said slide 89 pressed against the end of the screw 93 whereby said slide 89 is moved up and down as said screw 93 is threaded in and out of said bracket 90 by manipulation of the knob 91. The limit of the motion created in the finger 83 by engagement with stop 84 is reached when the shaft 66 is turned so that the weighing arms 8, 8 extend directly downward as shown in Fig. 6 at which time the heel portions 68 of said arms 8, 8 engage end portions of the fixed angular bar 69 and block further movement. This particular position of the weighing head 2 represents the discharge position thereof in that it continues to be held in said position during further movement of said conveyor 3 and the glass rod 1 is swept from the weighing arms 8, 8 by the inclined edges of the ejecting chute means 94 located over the hopper 12 below the tripping means 11 in said movement. During this latter period of motion by the conveyor 3, the fixed condition of the finger 83 of the weighing head 2 causes it to press against the stop 84 with such force that the supporting arm 86 is pulled away from the permanent magnet 88 and swings about the pivot pin 87 extending from the slide 89 of the tripping means 11 as shown. The weight of the arm 86 is sufficient at such times to keep the finger 83 pulled back and is effective until the glass rod 1 is swept from the weighing arms 8, 9 and the head 2 moves sufficiently to carry it beyond the swing of the stop 84. A rounded contour to the portion of the stop 84 then in engagement with the finger 83 assists said finger 83 to slide out from under said stop 84. When the weighing head 2 passes beyond the tripping means 11, the arm 86 supporting said stop 84 swings down by its own weight to a position where it again contacts and is attracted by the permanent magnet 88. The force with which the magnet 88 attracts the arm 86 keeps said magnet 88 and arm 86 together in the rebound of said arm 86 which rebound effects a momentary separation of said magnet 88 from the slide 89. The motion of the magnet 88 is absorbed in compressing the spring 95 which is located between the slide 89 and the nuts on the bolt 96 by which said magnet is fastened to said slide 89.

The above operation places the tripping means 11 in condition to again function properly in the apparatus; however, the time interval consumed in tipping one of the weighing heads 2 and then allowing said means 11 to return to its operative position is such as to prevent it from functioning properly with the directly succeeding weighing head 2 carried by the conveyor 3. This condition of operation is circumvented by having corresponding tripping means 11 on opposite sides of the apparatus at each tripping station and having successive weighing heads 2 with the tripping fingers 83 alternately placed at opposite sides thereof. In the combination of apparatus, every second weighing head 2 is arranged to function with the tripping means 11 along one side of the apparatus whereas the other weighing heads 2 are arranged to function with those tripping means 11 on the opposite side thereof and the time interval is doubled between successive possible operative periods thereof. Opposite tripping means 11 must be adjusted to tip a weighing head 2 holding the same weight glass rod 1 in every instance as the glass rods 1 discharged below opposite tripping means 11 are caught in the same hopper 12. The last tripping means 11 in both series thereof along the path of movement of the weighing head 2 is adjusted considerably lower than any of the others in that it must cause said weighing head 2 to discharge any glass rod 1 it may contain regardless of its lightness in weight.

Following the discharge of the glass rods 1 in the course of movement of the head 2 through the output end of the apparatus both chains 6 of the conveyor 3 pass onto driven sprockets like that shown at 97 on shaft 98 and are carried up into the upper span thereof. Means such as an electric motor and speed reducer (not shown) provide through the chain 99 and a sprocket (not shown) on shaft 98 the single means of operating the apparatus at a uniform rate at all times.

Although the machine shown herein segregates rods or tubes according to weight, it may be employed as part of a process of selecting tubes according to wall thickness. Thus, should the length of the tubing be held fairly uniform and the outside gauged to a uniform diameter before entering the machine, the wall thickness may not be the same in all instances. However, by further segregating such tubes in my machine according to weight, they are then necessarily segregated according to wall thickness. This is done for the benefit of the next operation, for instance miniature bulb blowing, whereby each bulb blowing machine is set to receive tubes of uniform outside and inside diameter.

What I claim as new and desire to secure by Letters Patent of the United States is:

1. Apparatus for sorting lengths of glass rod or tubing according to weight comprising a conveyor, means to advance said conveyor along a predetermined path of movement, a weighing head mounted on the conveyor including movable weight responsive support means supporting a length of rod or tubing and movable thereby into a balanced weighing position as determined by the weight of the rod or tubing carried thereby, said head being further provided with engagement means unitarily movable with and displaceable by the weight responsive means in accordance with the weight of the rod or tubing carried thereby, means including a succession of tripping means spaced progressively closer to the path of movement of the head in the direction of movement of the conveyor, at a series of grading stations therealong, for selectively engaging the said engagement means in accordance with the degree of displacement thereof by the rod or tubing to thereby unitarily move both the said engagement means and the associated weight-responsive means a further distance beyond their said balanced weighing position to a discharge position in which the said support means still supports the rod or tubing, and ejecting means at each of said stations arranged in the path of movement of the rod or tubing held by said support means when in said discharge position to engage the rod or tubing and remove it from said support means during the continued movement of the head along its path of travel while the support means is held in its said discharge position by said tripping means to a discharge position while still retaining the rod or tubing, and ejecting means at each of said stations arranged in the path of movement of the rod or tubing held by said support means when in said discharge position to engage the rod or tubing and remove it from said support means during the continued movement of the latter in its said discharge position.

2. Apparatus for sorting lengths of glass rod or tubing according to weight comprising a conveyor, means to advance said conveyor along a predetermined path of movement, a carrier head mounted on the conveyor and including support means fixedly mounted on said conveyor and movable weight responsive support means separate from said fixedly mounted support means, said fixedly mounted and weight responsive support means each supporting the rod or tubing through a portion of the said path of movement, said head further including engagement means unitarily movable with and displaceable by the weight responsive means in accordance with the weight of the rod or tubing carried thereby, means along said path of movement for gradually repositioning the movable support means relative to the fixedly mounted support means to effect transfer of the rod or tube from the said fixedly mounted support means to the movable support means so as to be supported solely by the latter, and means including a succession of tripping means spaced progressively closer to a succeeding portion of the path of movement of the head in the direction of movement of the conveyor, at a series of grading stations therealong, for selectively actuating the said engagement means of the head in accordance with the degree of displacement thereof to effect removal of the rod or tube from said movable support means.

3. Apparatus for sorting lengths of glass rod or tubing according to weight comprising a conveyor, means to advance said conveyor along a predetermined path of movement, a weighing head mounted on the conveyor and having tiltable means supporting a length of rod or tubing and tiltable to a predetermined angular weighing position in accordance with the weight of the rod or tube carried thereby, means including a succession of tripping means spaced progressively closer to the path of movement of the head in the direction of movement of the conveyor, at a series of grading stations therealong, to selectively engage and thereby tilt the said tiltable means a further amount beyond its said weighing position to a discharge position in which the said tiltable means still supports the rod or tubing, and ejecting means at each of said stations arranged in the path of movement of the rod or tubing held by said tiltable means when in said discharge position to engage and remove the rod or tubing from said tiltable means during the continued movement of the latter along its path of travel while held in its said discharge position by said tripping means.

4. In a machine of the class described, the combination of a conveyor, a plurality of weighing heads mounted on said conveyor and carried thereby along a predetermined path through a succession of weight-grading stations, said weighing heads including tube-supporting counter-balanced scale arms movable into predetermined weighing positions in accordance with the weight of respective tubes carried thereby, a series of tripping means spaced progressively closer to the path of movement of said heads in the direction of movement of the conveyor and selectively engageable with said heads by virtue of the positions of respective scale arms to thereby move the said arms a further distance beyond their said weighing position into a discharge position in which the tube is till supported on said arms, and ejecting means arranged in the path of movement of the tube held by said scale arms when in said discharge position to engage and remove the tube from the said arms during the continued movement of the latter along their path of travel while held in their said discharge position by said tripping means.

5. Apparatus for sorting lengths of glass rod or tubing according to weight comprising a conveyor, means for advancing said conveyor along a predetermined path of movement, a weighing head mounted on the conveyor and having a freely rotatable shaft, counter-weighted scale arms attached to said shaft and supporting a length of rod or tubing, said scale arms being tiltable to a predetermined angular weighing position about said shaft in accordance with the weight of the rod or tubing carried thereby, engagement means also attached to said shaft and rotatable thereby to a corresponding predetermined angular position about said shaft, means including a succession of tripping means spaced progressively closer to the path of movement of the head in the direction of movement of the conveyor, at a series of grading stations therealong, for selectively engaging the said engagement means and thereby rotating the shaft and tilting the scale arms a further amount beyond their said weighing position to a discharge position in which the said scale arms still support the rod or tubing, and ejection means at each of said stations arranged in the path of movement of the rod or tubing held by said scale arms when in said discharge position to engage and remove the rod or tubing from said scale arms during the continued movement of the latter along their path of travel while held in their said discharge position by said tripping means.

6. In apparatus for sorting length of glass rod or tubing according to weight the combination of a conveyor, means for advancing said conveyor along a predetermined path of movement, a weighing head mounted on the conveyor and having a freely rotatable shaft, counter-weighted scale arms attached to said shaft and supporting a length of rod or tubing, said scale arms being tiltable to a predetermined angular weighing position about said shaft in accordance with the weight of the rod or tube carried by said arms, rotation dampening means mount on said shaft, to dampen the rotational weighing movement thereof, a series of tripping means spaced progressively closer to the path of movement of said heads in the direction of movement of the conveyor, at a series of grading stations therealong, and selectively engageable with said heads by virtue of the angular weighing position of said arms to thereby tilt the latter a further amount beyond their said weighing position to a discharge position in which the said arms still support the rod or tubing, and ejecting means at each of said stations arranged in the path of movement of the rod or tubing held by said scale arms when in said discharge position to engage and remove the rod or tubing from said arms during the continued movement of the latter along their path of travel while held in their said discharge position by said tripping means.

7. Apparatus for sorting lengths of glass rod or tubing according to weight comprising a conveyor, means to advance said conveyor along a predetermined path of movement, a weighing head mounted on the conveyor and having weight responsive support means supporting a length of rod or tubing and engagement means displaceable together with the weight responsive means by the rod or tubing into a weighing position in accordance with the weight of the rod or tubing carried by said support means, a succession of tripping means each comprising yieldably mounted stop means spaced progressively closer to the path of movement of the head in the direction of movement of the conveyor, at a series of grading stations therealong, and selectively engageable with the said engagement means to displace said support means a further amount beyond its said weighing position to a discharge position, said yieldable stop means being immovable under moderate pressure by said engagement means whereby to displace the support means to its said discharge position but yielding under increased pressure by said engagement means to permit continued movement of the weighing head along its path of travel.

8. Apparatus for sorting lengths of glass rod or tubing according to weight comprising a conveyor, means to advance said conveyor along a predetermined path of movement, a weighing head on the conveyor having weight responsive support means for supporting a length of rod or tubing and engagement means displaceable together with the weight responsive means in accordance with the weight of the rod or tubing carried thereby, and a succession of tripping means each comprising yieldably mounted stop means spaced progressively closer to the path of movement of the head at a series of grading stations for selective engagement with the said engagement means and including magnet means arranged to retain said stop in normal position under moderate pressure to effect displacement of said weight responsive support means to a discharge position but ineffective under increased pressure to prevent displacement of said stop means to a position permitting continued movement of the weighing head.

9. Apparatus for sorting lengths of glass rod or tubing according to weight comprising a conveyor, means to advance said conveyor along a predetermined path of movement, a weighing head on the conveyor having weight responsive support means for supporting a length of rod or tubing and engagement means displaceable together with the weight responsive means in accordance with the weight of the rod or tubing carried thereby, and a succession of tripping means each comprising yieldably mounted stop means spaced progressively closer to the path of movement of the head in the direction of movement of the conveyor, at a series of grading stations therealong, for selective engagement with the said engagement means and including magnet means arranged to retain said stop in normal position under moderate pressure to effect displacement of said weight responsive support means to a discharge position but ineffective under increased pressure to prevent displacement of said stop means to a position permitting continued movement of the weighing head, and means mounting said magnet means in place under spring pressure so that it remains in engagement with said stop means during the rebound of the latter when it is again pulled into its normal position by the said magnet means.

10. Apparatus for sorting lengths of glass rod or tubing according to weight comprising a conveyor, means for advancing said conveyor along a predetermined path of movement, a weighing head on the conveyor having tiltable means for supporting a length of rod or tubing and associated engagement means adapted to be tilted therewith to a predetermined angular position in accordance with the weight of the rod or tube carried thereby, and means including a succession of tripping means each comprising yieldably mounted stop means spaced progressively closer to the path of movement of the head in the direction of movement of the conveyor, at a series of grading stations therealong, for selective engagement with the said engagement means, said stop means including a magnetizable arm member pivotally mounted above the said path of movement and having associated therewith a magnet positioned to hold the said arm and thereby retain the stop in normal position under moderate pressure for causing the engagement means and tiltable support means to be tilted to a discharge position to effect release of a rod or tube at a selected one of said stations and for allowing said arm and stop to swing out of normal position under greater pressure and permit continued movement of the weighing head.

11. In a machine of the class described, the combination of a conveyor, a plurality of weighing heads movably mounted on said conveyor and carried thereby along a predetermined path through a succession of weight-grading stations, said weighing heads including tube-supporting counter-balanced scale arms and engagement means unitarily movable and displaceable together with scale arms into predetermined weighing positions in accordance with the weight of respective tubes carried thereby, the said engagement means of successive heads being alternately located at opposite sides of the path of travel of said heads, and means including a succession of pairs of tripping mechanisms located at said grading stations and selectively engageable with respective ones of said engagement means in accordance with their said displaced weighing positions to move the respective scale arms to a discharge position, the individual tripping mechanisms of each pair being located at opposite sides of the path of travel of said heads.

12. Apparatus for sorting lengths of glass rod or tubing according to weight comprising an endless conveyor having upper and lower spans of movement, a carrier head mounted on the conveyor including support means fixedly mounted on said conveyor and initially holding a length of rod or tubing during location of said head in the upper span of the conveyor and also including weight responsive support means separate from and movable into opposed cooperative relation to the fixedly mounted support means to receive the rod or tubing by gravity movement thereof from said fixedly mounted support means when the head is inverted and in the lower span of the conveyor and to hold the rod or tubing during location of said head in the lower span of the conveyor, said head further including engagement means unitarily movable with and displaceable by the weight responsive support means in accordance with the weight of the rod or tubing carried thereby, means extending along the course of movement of the head between the upper and lower spans of the conveyor and continuing along a portion of the lower span for exerting pressure against the weight responsive means to move it into cooperative relation to the fixedly mounted support means to receive the rod or tubing by gravity movement thereof from the said fixedly mounted support means and for then gradually withdrawing said pressure to allow said weight responsive means to assume the full support of said rod or tubing, means including a succession of tripping means spaced progressively closer to the path of movement of the head in the direction of movement of the conveyor, at a series of grading stations therealong, and selectively engageable with the said engagement means of said head in accordance with the degree of displacement thereof to thereby unitarily move both the said engagement means and weight responsive support means to an unloading position for removal of the rod or tubing from said head.

13. In a machine of the class described, the combination of a conveyor, a plurality of weighing heads movably mounted on said conveyor and carried thereby along a predetermined path through a succession of weight-grading stations, said weighing heads including tube-supporting counter-balanced scale arms movable into predetermined weighing positions in accordance with the weight of respective tubes carried thereby, a series of tripping means at said stations spaced progressively closer to the path of movement of said heads in the direction of movement of the conveyor and selectively engageable with said heads by virtue of the said weighing positions of respective arms to thereby displace the arms to a discharge position, and chute means at said stations disposed in the path of movement of the tubes held in the arms so displaced to discharge positions for engaging and sweeping the tubes from said arms.

14. Apparatus for sorting lengths of glass rod or tubing according to weight comprising an endless conveyor having substantially horizontally extending upper and inverted lower spans joined at their ends by direction-reversing end portions, means to advance said conveyor along its said path of movement, a plurality of heads mounted on and spaced along said conveyor, each of said heads comprising a cradle support fixedly mounted on and facing outwardly of said conveyor for receiving and supporting solely by itself a glass rod or tubing in a horizontal position transversely of the conveyor and a pivoted support means comprising a counterweighted scale arm pivotally mounted on said conveyor to swing in a vertical plane lengthwise of the conveyor and normally held by its counterweighted end in a projecting position swung outwardly away from said conveyor, said scale arm being provided with a hooked outer end facing said cradle support, means disposed adjacent the path of travel of the upper span of said conveyor for feeding into the cradle support of said heads a glass rod or tubing, cam means substantially co-extensive with the direction-reversing forward end portions of said conveyor for engaging the said pivoted support means and swinging their scale arms inwardly toward the conveyor to position their hooked ends closely adjacent and opposite their respective cradle supports so as to receive and support solely by themselves the glass rod or tubing from said cradle support upon inverting of the latter and dropping of the glass rod or tubing therefrom by gravity, and a succession of tripping means spaced along the path of travel of the lower span of said conveyor at a series of grading stations for engaging the said pivoted support means in accordance with the degree of pivotal displacement thereof by the weight of the glass rod or tubing thereon to thereby effect removal of the glass rod or tubing from the scale arm of said pivoted support means.

OSCAR A. BOYER.

References Cited in the file of this patent
UNITED STATES PATENTS

| Number | Name | Date |
|---|---|---|
| 1,443,193 | Phelps | Jan. 23, 1923 |
| 1,626,359 | Rundell | Apr. 26, 1927 |
| 1,770,810 | Schoonenberg | July 15, 1930 |
| 1,814,026 | Draeger | July 14, 1931 |
| 1,835,186 | Schoonenberg | Dec. 8, 1931 |
| 1,846,327 | Gray | Feb. 23, 1932 |
| 2,385,038 | Snyder | Sept. 18, 1945 |
| 2,451,836 | Jordan | Oct. 19, 1948 |